(12) United States Patent
Bringer et al.

(10) Patent No.: US 7,929,732 B2
(45) Date of Patent: Apr. 19, 2011

(54) METHODS OF IDENTIFIER DETERMINATION AND OF BIOMETRIC VERIFICATION AND ASSOCIATED SYSTEMS

(75) Inventors: Julien Bringer, Paris (FR); Paul Welti, Paris (FR)

(73) Assignee: Morpho, Paris (FR)

( * ) Notice: Subject to any disclaimer, the term of this patent is extended or adjusted under 35 U.S.C. 154(b) by 1122 days.

(21) Appl. No.: 11/657,172

(22) Filed: Jan. 23, 2007

(65) Prior Publication Data
US 2007/0183632 A1 Aug. 9, 2007

(51) Int. Cl.
*G06K 9/00* (2006.01)
*G06F 21/00* (2006.01)

(52) U.S. Cl. ............... 382/115; 713/186; 902/3

(58) Field of Classification Search .......... 382/115; 902/3; 713/186
See application file for complete search history.

(56) References Cited

U.S. PATENT DOCUMENTS

| | | | | |
|---|---|---|---|---|
| 2002/0029341 | A1* | 3/2002 | Juels et al. | 713/184 |
| 2002/0120592 | A1* | 8/2002 | Juels et al. | 706/8 |
| 2005/0286746 | A1* | 12/2005 | Silvester | 382/116 |
| 2006/0075255 | A1* | 4/2006 | Duffy et al. | 713/186 |
| 2008/0219515 | A1* | 9/2008 | Namgoong | 382/117 |

FOREIGN PATENT DOCUMENTS

WO 00/51244 8/2000

OTHER PUBLICATIONS

Knudsen et al, "Construction of Secure and Fast Hash FUnctions Using Nonbinary Error-Correcting codes", IEEE Sep. 2002, pp. 2524-2539.*
Fhloinn et al, "Iris Matching Using Error-Correcting Codes", ISSC 2006, pp. 179-184.*
French Search Report dated Aug. 1, 2006 corresponding to related French Patent Application No. FR 06 00580.
Federal Information Processing Standards Publication 180-1, "FIPS", Apr. 17, 1995, Announcing the Standard for Secure Hash Standard.
Hao et al., University of Cambridge, Technical Report No. 640, "Combining cryptography with biometrics effectively," Jul. 2005.
Juels et al., "A Fuzzy Commitment Scheme," 6th ACM Conference on Computer and Communications Security, p. 28-36, Nov. 2-4, 1999.
Tuyls et al., "Practical Biometric Authentication with Template Protection," Lectures in Computer Science, vol. 3546, pp. 436-446, 2005.

* cited by examiner

*Primary Examiner* — Kathleen S Yuan
(74) *Attorney, Agent, or Firm* — McDonnell Boehnen Hulbert & Berghoff LLP

(57) ABSTRACT

The invention relates to a method of determining an identifier of determined discriminating power from biometric data. According to the method, biometric data is obtained relating to an individual. The biometric data is converted into a digital string. A word of an error-correcting code is associated with the individual. The error-correcting code word is added to the digital string. An identifier relating to the individual is determined by applying a hashing function to the error-correcting code word, the hashing function being selected to ensure the determined discriminating power to said identifier.

12 Claims, 5 Drawing Sheets

$c_1 = m_3 =$ 1 1 1 1 1 1 1 1 1 1 1 1 [1] $H(C_1)$ $w_1 \oplus c_1 =$ 0 1 1 0 0 0 0 1 1 1 0 0 1

$w'_1 \oplus w_1 \oplus c_1 =$ 1 1 1 1 1 1 1 ⓪ 1 1 1 ⓪ 1

$w_1 =$ 1 0 0 1 1 1 1 0 0 0 0 1 1 0
$w_2 =$ 0 1 1 0 0 1 0 1 1 1 1 0 0 1
$w_2 \oplus w_1 \oplus c_1 =$ 0 0 1 0 0 1 1 1 1 1 0 0 0
$c_2 =$ 0 0 0 0 0 0 0 0 0 0 0 0 0 $= m_4$ H($c_2$)

FIG.7.

$w_1 =$ 1 0 0 1 1 1 1 0 0 0 0 1 1 0
$w_3 =$ 1 1 1 1 0 0 1 1 1 1 0 0 0
$w_3 \oplus w_1 \oplus c_1 =$ 1 1 1 0 0 0 1 1 1 0 0 0 0
$c_3 =$ 1 1 1 0 0 0 0 0 0 0 0 0 0 $= m_1$ H($c_3$)

METHODS OF IDENTIFIER
DETERMINATION AND OF BIOMETRIC
VERIFICATION AND ASSOCIATED SYSTEMS

BACKGROUND OF THE INVENTION

The present invention relates to using biometric data.

It is known to use biometric data relating to individuals in the context of numerous applications.

For example, verifying the identity of an individual may be based on comparing biometric data measured on individuals giving their identities with biometric data previously obtained in correspondence with said identities.

In another example, the grant of a right may be subject to biometric verification, where the term "grant of a right" should be understood very broadly (granting a driver's license, a travel ticket, a payment, access to premises, etc.).

A problem is associated with the nature of the biometric data used. The discriminating power of that data can be very variable. Discriminating power corresponds to the ability to characterize an individual with greater or lesser precision.

Thus, biometric data such as the general shape of a hand or the length of a few fingers of the hand discriminates relatively little, since there is a relatively high probability of any two individuals presenting the same data. Conversely, biometric data such as the fingerprints of all ten digits of the hand, or such as the iris characteristics of the eyes presents a relatively high level of discrimination, such that there is a relatively small probability of any two individuals presenting the same data.

Some applications require biometric data to be used with strong discriminating power, since they relate exclusively or almost exclusively to particular individuals. This can apply for example to an application seeking to give specialized personnel access to a strategic site.

In contrast, in other applications where the stakes are lower, the use of biometric data with poor discriminating power can be preferred, recommended, or even made mandatory.

A drawback of highly discriminating biometric data is that it can invade privacy since it can make it possible to characterize an individual completely. Thus, it is not impossible that an application using highly discriminating biometric data could be misappropriated to find data relating to its users (in particular personal data, e.g. identity) outside the normal context of use.

This drawback can lead to certain individuals who seek to remain anonymous avoiding applications that use biometric data that is judged to be too highly discriminating.

Furthermore, in some countries, legislation is in place enabling a given application to be refused if it uses highly discriminating biometric data, even though it would be accepted if it used biometric data with weaker discriminating power. Typically, it can be required that the level of discrimination implemented is proportional to the security at stake in the intended application.

The fact that applications need to use biometric data with different discriminating powers makes it necessary to adapt the means for obtaining and processing biometric data to each application, which is time consuming and involves relatively high implementation costs.

An object of the present invention is to limit those drawbacks.

SUMMARY OF THE INVENTION

The invention thus provides a method of taking biometric data and of determining therefrom an identifier of determined discriminating power. The method comprises the following steps relating to an individual:

obtaining biometric data relating to the individual;

converting the biometric data into a digital string;

associating a word of an error-correcting code with the individual;

adding the error-correcting code word to the digital string; and determining an identifier relating to the individual by applying a hashing function to the error-correcting code word, the hashing function being selected to ensure that said identifier has the determined discriminating power.

The identifier as obtained in this way stems from biometric data relating to the individual. Nevertheless, it has its own discriminating power that is less than that of the initial biometric data. In other words, the identifier corresponds to controlled degradation of the initial biometric data.

Furthermore, the degradation is not invertible, i.e. because of the properties of the hashing function, it is practically impossible to find the code word when knowing only the hashed code word.

The discriminating power of the identifier is determined, possibly in advance, e.g. with reference to a level of discrimination desired for an application that provides for verification making use of said identifier. The discriminating power can thus be selected depending on requirements. In particular it can be selected to be sufficiently weak to guarantee a certain level of privacy protection, whenever that is necessary.

The invention also provides a biometric verification method using a first data medium storing in association, for at least one individual in a set of individuals: an identity relating to said individual; the result of adding a first word of an error-correcting code associated with said individual and a first digital string obtained from biometric data relating to said individual; and at least one identifier of determined discriminating power obtained by applying a hashing function to the first error-correcting code word. The method comprises the following steps relating to an individual of the set of individuals:

obtaining biometric data relating to the individual;

converting the biometric data into a second digital string;

determining a second error-correcting code word corresponding substantially to adding the second digital string to the result of adding the first error-correcting code word to the first digital string stored on the first data medium in association with the identity relating to said individual;

applying said hashing function to the second error-correcting code word; and comparing the result of applying said hashing function to the second error-correcting code word with the identifier of determined discriminating power stored on the first data medium in association with the identity relating to said individual.

Such biometric verification is performed using an identifier having discriminating power that matches expectations. It is also based on initial biometric data, which may be obtained using conventional acquisition means, for example, regardless of the level of discrimination that is desired.

Advantageously, a plurality of identifiers having distinct determined discriminating powers can be stored for a given individual. An identifier is then selected from that plurality, where the selected identifier has discriminating power that best matches the level of discrimination desired for the application that is to be implemented.

Thus, starting from a common biometric measurement, it is possible to implement verifications having different levels of discrimination, depending on requirements. This implies significant savings in the means that need to be deployed (e.g. biometric sensors), and great simplicity in implementation.

The invention also provides an identification method using a first data medium storing in association, for each individual in a set of individuals: an identity relating to said individual; the result of adding a first word of an error-correcting code associating said individual with a first digital string obtained from biometric data relating to said individual; and at least one identifier of determined discriminating power obtained by applying a hashing function to the first error-correcting code word. The method comprises the following steps relating to an individual of the set of individuals:

obtaining biometric data relating to the individual;
converting the biometric data into a second digital string;
determining a plurality of second error-correcting code words each corresponding substantially to adding the second digital string to the result of adding the first error-correcting code word to the first digital string stored on the first data medium for an individual of said set of individuals;
applying said hashing function to each second error-correcting code word;
comparing the result of applying said hashing function to each second error-correcting code word with the identifier corresponding to the determined discriminating power that is stored on the first data medium; and
determining the identity of said individual, said identity corresponding to an identity stored on the first data medium in association with an identifier for which said comparison has found equality.

The invention also proposes a system comprising means for obtaining biometric data and digital processor means arranged to implement the above-mentioned method of determining an identifier of determined discriminating power from biometric data.

The invention also provides a system comprising means for obtaining biometric data and digital processor means arranged to implement the above-mentioned method of biometric verification.

The invention also provides a system comprising means for obtaining biometric data and digital processor means arranged to implement the above-mentioned identification method.

The invention also provides a computer program product comprising code instructions adapted to implement the above-mentioned method of determining an identifier of determined discriminating power from biometric data, on being loaded and executed by computer means.

The invention also provides a computer program product comprising code instructions adapted to implement the above-mentioned method of biometric verification, on being loaded and executed by computer means.

The invention also provides a computer program product comprising code instructions adapted to implement the above-mentioned method of identification, on being loaded and executed by computer means.

The preferred features of the above aspects which are indicated by the dependent claims may be combined as appropriate, and may be combined with any of the above aspects of the invention, as would be apparent to a person skilled in the art.

BRIEF DESCRIPTION OF THE DRAWINGS

FIGS. 4 to 7 are simplified examples of digital strings used in the context of performing biometric verifications on the principles of the invention.

DESCRIPTION OF PREFERRED
EMBODIMENTS

Figure 1:
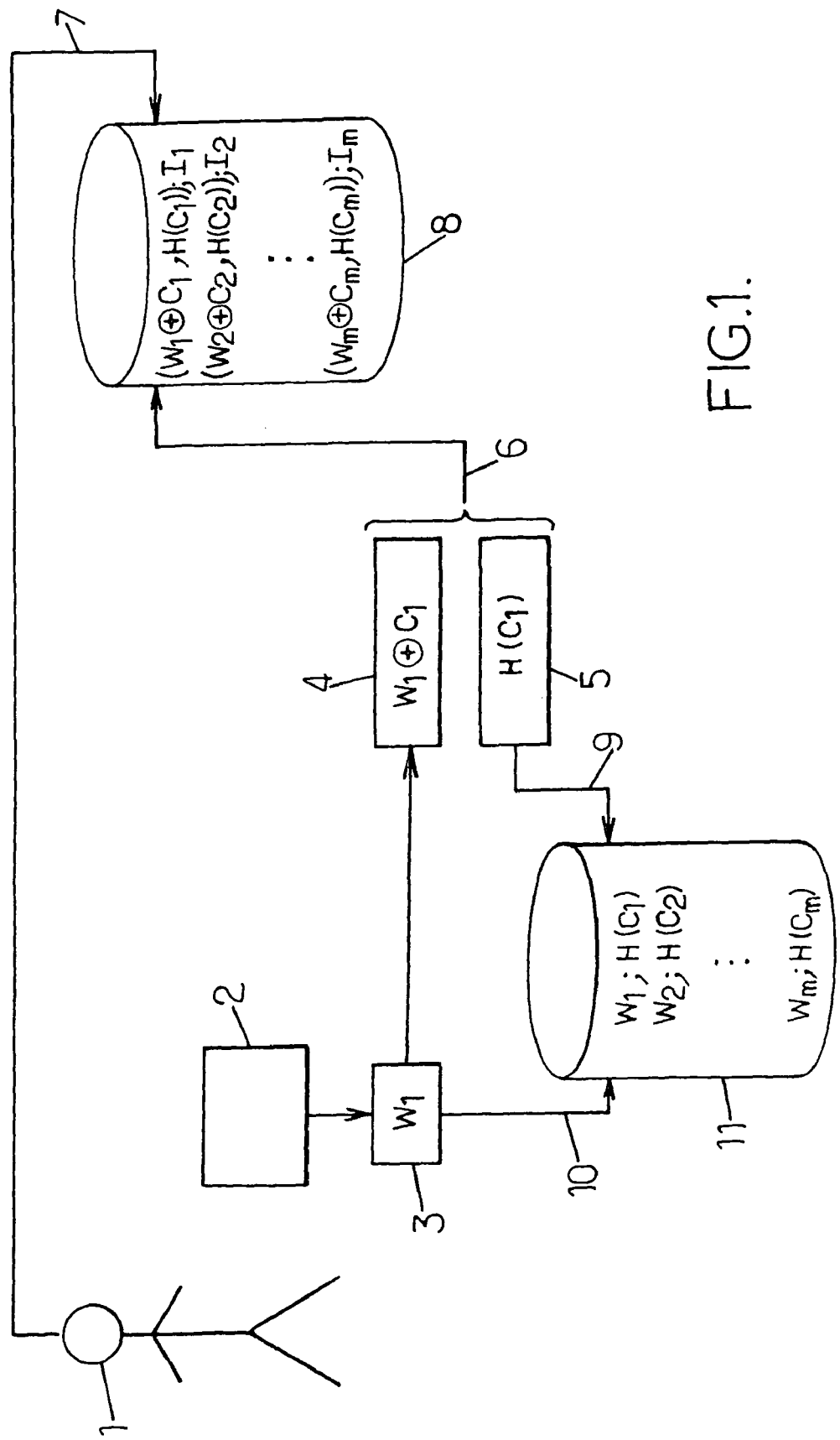
FIG. 1 is a diagram showing the steps of an enrollment stage enabling an identifier to be determined in accordance with the invention.

FIG. 1 shows an individual 1 for whom it is desired to determine an identifier of determined discriminating power, during a stage referred as an "enrollment" stage. This discriminating power may be selected, for example, so as to comply with a level of discrimination required by an application implementing biometric verification. The identifier as determined in this way can then be used during biometric verification, by providing a guarantee that the requirements of the application in terms of discrimination are satisfied.

The identifier is determined as follows.

Biometric data is initially obtained for the individual 1. This biometric data may be of various different types. Preferably, it presents relatively high discriminating power. Discriminating power is sometimes characterized by a "false acceptance" rate that corresponds to the probability of confusing any two people on analyzing their biometric data. The biometric data obtained in the present example is thus advantageously selected to present an acceptable false acceptance rate that is below a predetermined threshold, e.g. $10^{-6}$. The data may thus relate to fingerprints or to the characteristics of the iris of an eye, for example.

The biometric data is advantageously obtained by acquisition using a sensor 2. The sensor is adapted to the kind of biometric data that it is desired to obtain. Thus, it may be a conventional fingerprint sensor or a sensor of iris characteristics.

Once obtained, the biometric data of the individual 1 is converted into a digital string, in a manner that is known per se. The digital string $w_1$ obtained in this way (step 3) may be constituted by a string of binary digits, for example.

When the biometric data comprises fingerprints, obtaining the string $w_1$ may comprise pre-orientation of fingerprint images in a particular direction, and extracting certain characteristics (e.g. minutiae or ridge directions). When the biometric data relates to the iris, an iris code can be extracted. These methods are known in themselves and can depend on a type of error correction used (the application of such error correction is described below). Certain methods are described in the published articles cited below. Naturally, other methods are also possible.

The individual is associated with a code word $c_1$ from an error-correcting code, which code word may be selected in random manner from the various words of the code. This word is a digital string, e.g. a binary string, as is preferably identical in size to the binary string $w_1$.

For this purpose, various error-correcting codes can be used. As non-limiting examples, mention can be made of the length 511 BCH code described by P. Tuyls, A. Akkermans, T. Kevenaar, G. J. Schrijen, A. Bazen, and R. Veldhuis, in the article "Practical biometric authentication with template protection", AVBPA 2005, LNCS 3546, 2005, published in 2005, or the concatenated Hadamard/Reed-Solomon code described by R. Anderson, J. Daugma, and F. Hao, in the article "Combining cryptography with biometrics effectively", Technical report UCAM-CL-TR-640, University of Cambridge, published in July 2005. Naturally, other error-correcting codes could be used.

Once associated with the individual 1, the error-correcting code word $c_1$ is added to the binary string $w_1$ (step 4). As is conventional in digital processing, the term "add" is used to mean the exclusive OR operation ($\oplus$), where adding the two binary strings is such that two identical bits having the same rank in both strings give rise to a "zero", whereas two different bits of the same rank in the two strings give rise to a "1". This produces a new binary string $w_1 \oplus c_1$.

An identifier $H(c_1)$ is also calculated from the code word $c_1$, where the function H is a hashing function (step 5). A hashing function is a compression function serving to obtain information that is shorter than the initial information that was applied thereto. It also has the property of delivering results that are very different from initial information items that differ very slightly, i.e. it accentuates differences between distinct items of information, so as to avoid it being easy to rediscover the initial information from the result of hashing.

In the context of the invention, the hashing function H is selected in such a manner that the resulting identifier $H(c_1)$ has determined discriminating power. In other words, the hashing function selected implies a probability of collision, i.e. a probability of reaching the same condensed version from distinct strings, that corresponds to the false acceptance rate that is presented by the identifier $H(c_1)$.

Advantageously, the hashing function is selected to have an equiprobable arrival space comprising a number of possible values that correspond substantially to the determined discriminating power of the identifier.

As a non-limiting example, use can be made of a hashing function H derived from the SHA-1 function described in the FIPS 180-1 standard, "Secure hash standard", published in April 1993 by the Federal Information Processing Standards organization, that produces condensed strings of 160 bits. Many other hashing functions could naturally also be used.

Thus, if it is desired that the identifier to be determined can take one value from a number of possible value that is equal to $2^n$, where n<160, it is possible to select a hashing function H such that for any binary string x of length l, $H(x)=[SHA-1(x)]_{i_1,\ldots,i_n}$, where $[X]_{i_1,\ldots,i_n}$ designates the bits of respective ranks $i_1, \ldots, i_n$ in the binary string x. Thus, $H(c_1)=[SHA-1(c_1)]_{i_1,\ldots,i_n}$, i.e. the identifier as determined, is a string of n bits corresponding to the bits of ranks $i_1, \ldots, i_n$ of the binary string that result from applying the SHA-1 function to the code word $c_1$. In this example, $H(c_1)$ thus has discriminating power of $2^n$. Because of the properties of the function H, any arbitrary individual has one chance in $2^n$ of having the same identifier $H(c_1)$ as the individual 1, even if some other code word $c_2$ is associated with that individual.

In the above example, it is thus possible to define the discriminating power of the identifier that is to be determined merely by setting the number n. If it is desired to be able to perform biometric verification in a manner that discriminates little, then n should be selected to be relatively small (e.g. less than 20). Conversely, if it is desired to be able to perform biometric verification in a highly discriminating manner, then n should be selected to be relatively large (e.g. greater than 20).

Advantageously, the information obtained relating to the individual 1, i.e. $w_1 \oplus c_1$ and $H(c_1)$ is subsequently stored in associated manner on a data medium (step 6). The information is also associated with an identity $I_1$ of the individual 1. This identity, which may consist in the surname and forename of the individual 1, but could possibly be constituted by other types of information, can be given by the individual 1 (step 7) or else can be obtained by other means. The identity is advantageously verified prior to being stored on the data medium.

In the example shown in FIG. 1, all of the information is stored in an identity database 8 for storing information about a set of individuals 1-m. In a variant, the items of information $w_1 | c_1$, $H(c_1)$, and $I_1$ could be stored in association on a biometric token advantageously held by the individual 1. Other data media can also be envisaged, insofar as they can subsequently be interrogated when performing biometric verification.

It should be observed that in the database 8, the binary string $w_1$ characterizing the individual 1 is not stored as such, but only in the form $w_1 \oplus c_1$. Thus, any person having access to the database cannot find a link between the identity $I_1$ and the binary string $w_1$ of the individual 1. Such a person knowing the identity $I_1$ will be incapable of deducing therefrom the binary string $w_1$ on the basis of data in the database 8. Similarly, if such a person knows the binary string $w_1$, the identity $I_1$ cannot be deduced therefrom on the basis of data in the database 8.

Advantageously, the binary string $w_1$ of the individual 1 and the identifier $H(c_1)$ that is obtained are also stored with each other on a second data medium that may also be a database 11 or any other suitable medium (steps 9 and 10). The biometric database 11 does not have identity information, such as the identity $I_1$ of the individual 1, thereby guaranteeing that privacy is protected.

It should be observed that all or some of the above-described operations can be implemented by a system advantageously making use of a computer program. The system may be constituted by a simple apparatus, comprising the sensor 2 and digital processor means appropriate for processing the binary strings, or else it may be distributed amongst different apparatuses capable of communicating with one another by any manner that can be envisaged.

Figure 2:
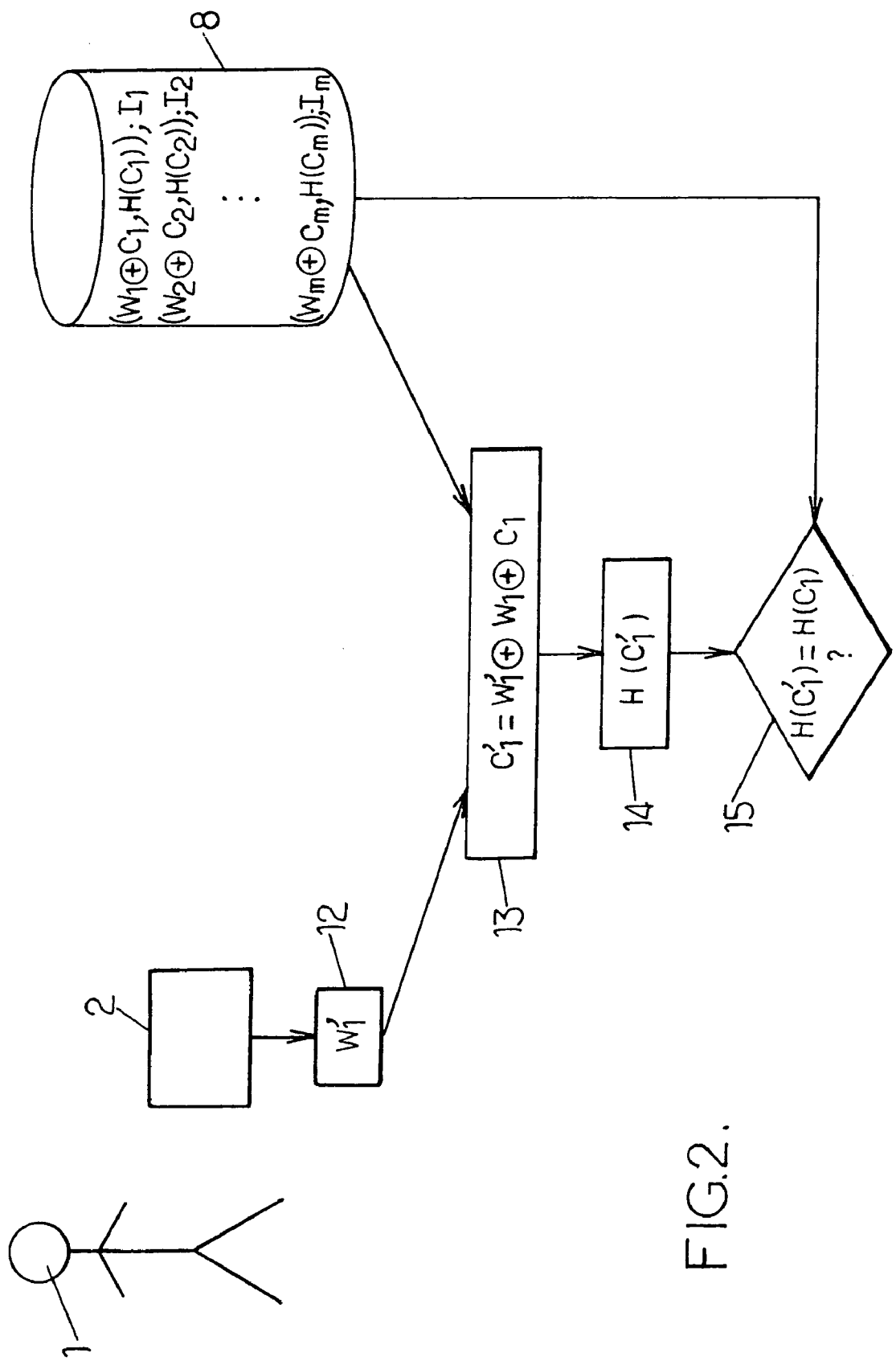
FIG. 2 is a diagram showing steps of biometric verification in accordance with the invention.

With reference to FIG. 2, there follows a description of how biometric verification can be performed using an identifier of determined discriminating power as described above. This biometric verification can be implemented in the context of any application. For example, it may be a prelude to granting a right, as specified in the introduction. The intended application requires a given level of discrimination, with reference to which the discriminating power of the above-described identifier has been determined.

In the example of FIG. 2, the individual 1 who has previously undertaken an enrollment stage as described with reference to FIG. 1, is now subjected to biometric verification. For this purpose, biometric data is obtained from the individual 1. The biometric data in question is data of the same type as that which was obtained during enrollment. It may advantageously be obtained with a sensor that is the same or of the same type as the sensor 2 of FIG. 1.

The resulting biometric data is then converted into a digital string, under the same conditions as during enrollment (step 12). In the example described, a binary string $w'_1$ is thus obtained which may differ from the binary string $w_1$ to a greater or lesser extent. These differences are associated with the lack of reproducibility in biometric measurements performed using the sensor 2. By way of example, two successive measurements of a fingerprint can differ because of variation in the angle of inclination of the finger or because of variation in the pressure exerted by the finger on the sensor between the two measurements.

Thereafter, a new binary string is calculated by adding $w'_1$ and the string $w_1 \oplus c_1$ as previously stored in the database 8 or any equivalent data medium (step 13). The string $w_1 \oplus c_1$ corresponding to the individual 1 is found in the database 8, e.g. using the identity $I_1$ as given by the individual 1.

The result of this new addition, i.e. $w'_1 \oplus w_1 \oplus c_1$ can consist in a word $c'_1$ of the error-correcting code to which the word $c_1$ belongs. Otherwise, the decoding algorithm associated with said error-correcting code is advantageously used in order to find the word $c'_1$ of the error-correcting code that is the closest to $w'_1 \oplus w_1 \oplus c_1$. The success of this operation relies on the fact that the error-correcting code is designed to correct a certain number of errors in binary strings, where the differences between $w'_1$ and $w_1$ are then thought of as errors.

The hashing function H as used in the above-described enrollment stage is then applied to the new code word $c'_1$ (step 14). The resulting condensed information $H(c'_1)$ is then compared with the identifier $H(c_1)$ stored in the database 8 for the individual 1 (step 15). The identifier $H(c_1)$ is found in the database 8, e.g. using the identity $I_1$ given by the individual 1.

If $H(c'_1)$ is identical to $H(c_1)$, then biometric verification can be considered as being a success, i.e. it is considered that the individual 1 being verified is indeed the individual who was previously enrolled as described with reference to FIG. 1. It is thus possible to perform authentication from the identity $I_1$ given by the individual 1.

Any differences between the strings $w_1$ and $w'_1$, providing they are not excessive, are smoothed out by the properties of the error-correcting code. In this way, for the example described with reference to FIG. 2, it can be hoped that a code word $c'_1$ will be obtained that is equal to $c_1$. Consequently, $H(c'_1)=H(c_1)$, and the individual 1 is successfully authenticated.

Conversely, if the individual being subjected to biometric verification pretends wrongly to have the identity $I_1$, then it is very likely that the code word $c'_1$ obtained for the individual using the above-described principles will be different from $c_1$. Under such circumstances, $H(c'_1)$ can differ from $H(c_1)$ and authentication fails. However, given the properties of the function H, it is nevertheless still possible that $H(c'_1)=H(c_1)$ even though $c'_1$ differs from $c_1$. Under such circumstances, authentication will be considered, wrongly, as being successful. The individual who has usurped the identity $I_1$ can then possibly pass him- or herself off as the individual 1. That constitutes an instance of false acceptance that the intended application is designed to tolerate.

This uncertainty is associated with the relatively poor discriminating power of the identifier $H(c_1)$. However, this low level of discrimination prevents any person who has access to the database 8 from retrieving the identity $I_1$ of the individual 1 from the identifier $H(c_1)$, since a plurality of individuals may have the same identifier $H(c_1)$. This ensures protection for the privacy of the individual 1.

It will be understood that biometric verification can thus be performed with a low level of discrimination in order to protect the privacy of the individual 1, even when using biometric data that presents a relatively high level of discrimination.

After the verification performed in step 15, other steps may optionally be implemented depending on the intended application. For example, a right might be granted to the individual 1 under such circumstances.

Figure 3:
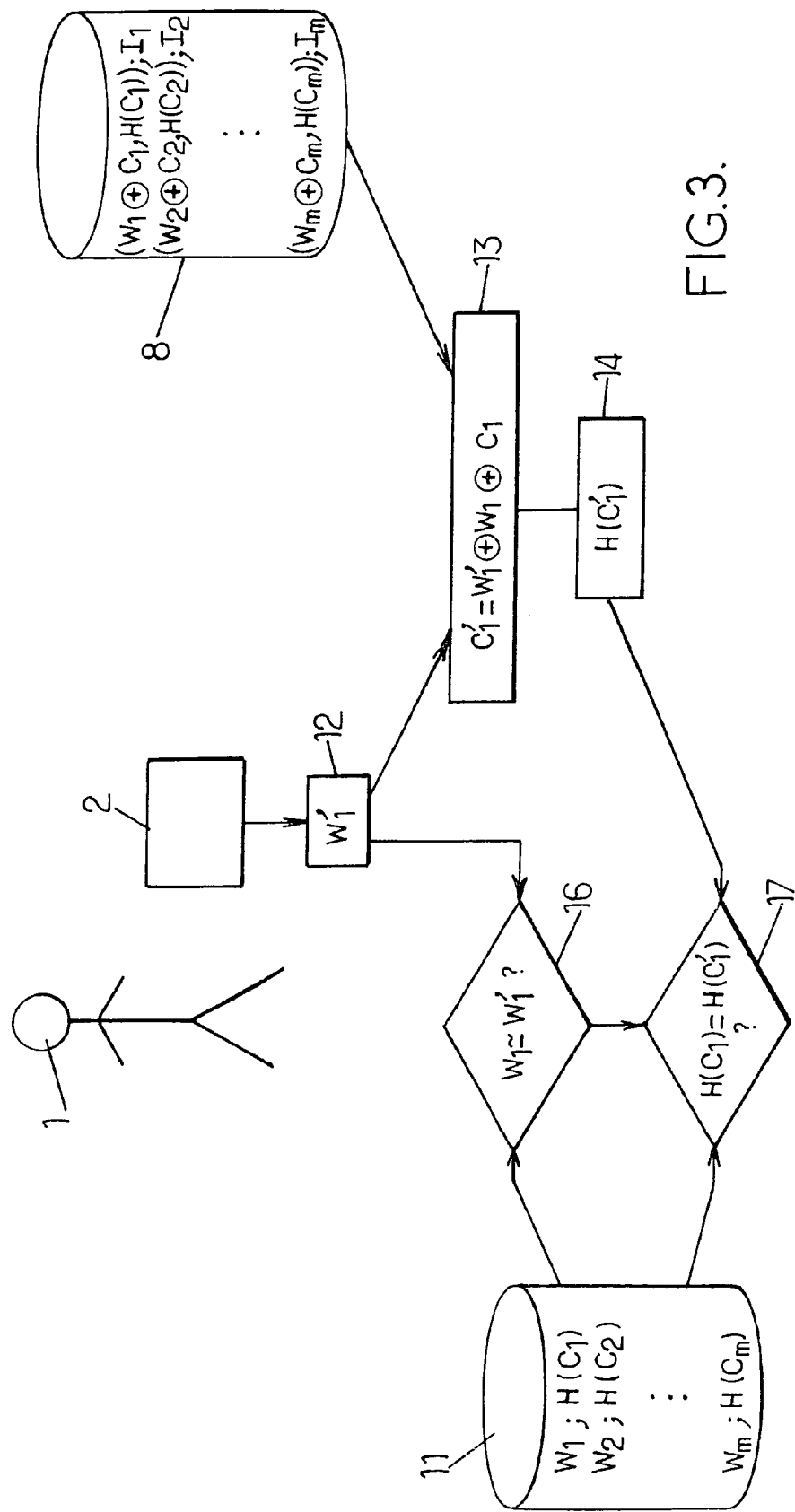
FIG. 3 is a diagram showing additional steps of biometric verification in a particular implementation of the invention.

FIG. 3 shows an example of biometric verification including verification steps additional to those of the example of FIG. 2. Steps 12 to 14 are identical to those of FIG. 2.

After obtaining the binary string $w'_1$ relating to the individual 1, the corresponding binary string $w_1$ is found in the biometric database 11 or any other equivalent data medium, i.e. the string is found that presents the greatest similarity with $w'_1$ and that is therefore likely to characterize the same individual 1 (step 16).

Thereafter, the identifier $H(c_1)$ previously stored in the biometric database 11 in association with $w_1$ during the enrollment stage is also found.

$H(c'_1)$ is then compared with the identifier $H(c_1)$ (step 17). If they are equal, it can then be concluded that the individual 1 has already been biometrically recorded in the database 11 during prior enrollment.

This verification can be useful, for example, in order to avoid the individual 1 being subjected to a plurality of successive enrollments that could potentially allow that individual to have the same right granted more than once (for example a plurality of driver's licenses with different identities, etc.).

Here again, the relatively poor discriminating power of the identifier $H(c_1)$ prevents any person who has access to the database 11 from finding the binary string $w_1$ characterizing the individual 1 on the basis of the identifier $H(c_1)$, since a plurality of individuals can have the same identifier $H(c_1)$. This ensures protection for the privacy of the individual 1.

It should be observed that all or some of the operations described with reference to FIGS. 2 and 3 can be implemented by a system that advantageously makes use of a computer program. The system may consist in a single apparatus, comprising the sensor 2 and the digital processor means needed for processing the binary string, or it may be spread over a plurality of apparatuses suitable for communicating with one another in any manner that can be envisaged. The system may be the same as that described with reference to FIG. 1 and used during enrollment. The systems could equally well be distinct.

In an implementation of the invention, a plurality of identifiers having distinct discriminating powers are determined for the individual 1. Thus, t identifiers $H_1(c_1)$, $H_2(c_1)$, ..., $H_t(c_1)$ having decreasing discriminating powers can be obtained and stored in association with the individual 1 in application of the principles described with reference to FIG. 1.

Depending on the application that it is desired to implement, biometric verification is performed as described with reference to FIG. 2 or FIG. 3, using the identifier of discriminating power that corresponds to the level of discrimination required for said application. Thus, an application requiring a high level of discrimination can require biometric verification using the identifier $H_1(c_1)$, whereas an application requiring a low level of discrimination can require biometric verification using the identifier $H_t(c_1)$, for example.

The desired level of discrimination can be determined beforehand, possibly as a result of negotiation with the individual concerned.

Under such circumstances, it will be understood that biometric verifications with different levels of discrimination can be performed using a single biometric data set and thus using a single sensor, in a manner that is transparent for the individual concerned. Nevertheless, the privacy of the individual is guaranteed wherever necessary, even if biometric data with a relatively high level of discrimination is initially acquired for said individual.

FIGS. 4 to 7 show simplified numerical examples for better understanding the operation of the above-described invention.

FIG. 4 shows a binary string $w_1$ assumed to characterize an individual 1. In the example shown, and for reasons of clarity and simplification, the binary string $w_1$ has only 14 bits, which provide a relatively low level of discrimination ($2^{14}$=16384 possible values in all). In reality, such a binary string could advantageously comprise a larger number of bits, for example 20 or more bits.

Furthermore, the error-correcting code C used is made up of four distinct words, namely $m_1$=11111110000000, $m_2$=00000001111111, $m_3$=11111111111111, and $m_4$=00000000000000. Given the format of these four words, it will be understood that the error-correcting code C can correct three errors without ambiguity. A binary string presenting three differences with one of these four words, e.g. $m_1$, will have even more differences with the other three words, such that it can be associated with $m_1$ without hesitation. Naturally, the code C selected for this example is a simplified code. In practice, error-correcting codes that are more complex, such as those mentioned above, could advantageously be used.

During the enrollment of the individual 1, a word of the code C, i.e. $m_3$, is associated with the individual 1, possibly in arbitrary manner. With the same notation as used above, this gives $c_1$=$m_3$. Then, the binary string $w_1 \oplus c_1$ is determined, i.e. $w_1 \oplus m_3$, as shown in FIG. 4.

In addition, a hashing function is applied to the code $c_1$=$m_3$. In the example described, the hashing function H used consists in selecting the second bit of a binary string, starting from the left. Thus $H(c_1)$ is equal to 1, as shown in FIG. 4 by a box round the selected bit. Naturally, such a hashing function is particularly simple, for reasons of clarity. In practice, it is possible to use hashing functions that are more complex, such as those mentioned above.

After the individual 1 has been enrolled, the two following items of information are available: $w_1 \oplus c_1$=01100001111001 and $H(c_1)$=1. This information is advantageously stored on a data medium so it can be found during a subsequent verification stage.

FIG. 5 shows an example of biometric verification concerning the individual 1. A new binary string $w'_1$ is obtained for the individual 1, e.g. using a new biometric measurement. This binary string $w'_1$ has three differences relative to the binary string $w_1$. The bits that differ are ringed in the binary string $w'_1$ of FIG. 5.

Then, in accordance with the principles described above, the binary string $w'_1 \oplus w_1 \oplus c_1$ is calculated and a search is made to find the word $c'_1$ of the code C that is closest to this string. It is found that the string $w'_1 \oplus w_1 \oplus c_1$ has three differences relative to the word $m_3$. The error correction then makes it possible to use the code word $m_3$ for this string $w'_1 \oplus w_1 \oplus c_1$. Using the same notation as above, this gives $c'_1$=$m_3$.

As a result, calculating $H(c'_1)$ finds $H(m_3)$, i.e. the binary value 1, as indicated by the box round the second bit of the word $c'_1$ in FIG. 5.

Since $H(c'_1)$=$H(c_1)$=1, the biometric verification is successful. The individual 1 has been authenticated with success. The individual may then perhaps benefit from a right being granted, for example.

FIG. 6 shows an example of biometric verification relating to an individual 2 attempting to pass for the individual 1.

The binary string $w_2$ characterizing the individual 2 is obtained, e.g. by performing a biometric measurement. This string $w_2$ differs very considerably from the string $w_1$ relating to the individual 1. Eleven bits (ringed in FIG. 6) differ between these two strings.

During biometric verification, the string $w_2 \oplus w_1 \oplus c_1$ is calculated, and then the word $c_2$ of the code C is found that is the closest to this string, using the error decoding properties of the code. In the present example, the string $w_2 \oplus w_1 \oplus c_1$ presents three differences with the word $m_4$ (ringed bits), so it is concluded that $c_2$=$m_4$.

The second bit $c_2$ (boxed in FIG. 6) is a 0, so $H(c_2)$=0. $H(c_2)$ thus differs from $H(c_1)$, so the verification fails. The individual 2 has not been able to pass for the individual 1.

In the example of FIG. 7, an individual 3 characterized by a binary string $w_3$ is trying to pass for the individual 1. This attempt succeeds since the binary string $w_3 \oplus w_1 \oplus c_1$ leads to code word $c_3$=$m_1$ and $H(c_3)$=$H(m_1)$=$H(m_3)$=$H(c_1)$=1, as can be seen in FIG. 3.

This example corresponds to a false acceptance as tolerated by the intended application. This false acceptance is due to the low discrimination power of the identifier $H(c_1)$ since it can take on only two values 0 or 1. Thus, whatever the binary string $w_i$ relating to an individual i, there is one chance in two that $H(c_i)$=$H(c_1)$.

This level of uncertainty is acceptable for the intended application. It also serves to make it impossible to find the identity $I_i$ of an individual i from that individual's identifier $H(c_i)$, even for a person having access to the data structure that stores $I_i$ and $H(c_i)$ in association.

The present invention can also be used in identification applications, i.e. to find the identity of an individual from a biometric measurement.

Thus, referring again to FIG. 2, the idea is to find the identity of the individual 1. Steps 12 to 14 are implemented as described above, except that the string $w'_1$ is added to all of the strings $w_1 \oplus c_1, w_2 \oplus c_2, \ldots, w_m \oplus c_m$ stored in the database 8 relating to distinct individuals, or at least to a plurality of those strings.

Thereafter, for each condensed item obtained $H(c'_1)$, $H(c'_2), \ldots, H(c'_m)$, it is verified whether it corresponds to the corresponding identifier $H(c_1), H(c_2), \ldots, H(c_m)$ that is stored in the database 8.

When equality is detected, an identity can be deduced for the individual in question. For example, if $H(c'_1)$=$H(c_1)$, then it can be concluded that the individual 1 possess the identity $I_1$ stored in association with $H(c_1)$.

Nevertheless, it should be observed that unambiguous determination of identity can be achieved, a priori, only for database sizes that are smaller than a certain limit as determined by the discriminating power. In general, a plurality of identities can correspond.

The invention claimed is:

1. A biometric verification method using a first data medium storing in association, for at least one individual of a set of individuals: an identity relating to said individual, the result of adding a first word of an error-correcting code associated with said individual to a first digital string obtained from biometric data relating to said individual and at least two identifiers of distinct determined discriminating powers obtained by applying respective hashing functions to the first error-correcting code word; the method comprising the following steps relating to an individual of the set of individuals:

obtaining biometric data relating to the individual;
converting the biometric data into a second digital string;
determining a second error-correcting code word corresponding substantially to adding the second digital string to the result of adding the first error-correcting code word to the first digital string stored on the first data medium in association with the identity relating to said individual;
determining a desired level of discrimination;
determining the identifier stored on the first data medium in association with the identity relating to said individual, having discriminating power corresponding substantially to the desired level of discrimination;

applying to the second error-correcting code word the hashing function in application of which said determined identifier was obtained; and comparing the result of applying said hashing function to said second error-correcting code word with the determined identifier.

2. A method according to claim 1, in which at least some of the hashing functions applied to the first error-correcting code word are selected to have an equiprobable arrival space comprising a number of possible values corresponding substantially to the determined discriminating power of the respective identifier.

3. A method according to claim 1, further comprising delivering a right when the comparing the result of applying said hashing function to said second error-correcting code word with the determined identifier finds equality between the result of applying said hashing function to the second error-correcting code word and the determined identifier.

4. A method according to claim 1, also using a second data medium storing in association, for at least said individual of the set of individuals: the first digitalstring obtained from biometric data relating to said individual and the identifiers of distinct determined discriminating powers obtained by applying respective hashing functions to the first error-correcting code word associated with said individual; the method further comprising the following steps relating to said individual of the set of individuals:

finding the first digital string stored on the second data medium and corresponding substantially to said second digital string;

finding the identifier stored on the second data medium in association with the found first digital string, having discriminating power corresponding substantially to the desired level of discrimination; and comparing the result of applying the hashing function in application of which the found identifier was obtained to the second error-correcting code word with the identifier as found.

5. A biometric verification system using a first data medium storing in association, for at least one individual of a set of individuals: an identity relating to said individual, the result of adding a first word of an error-correcting code associated with said individual to a first digital string obtained from biometric data relating to said individual and at least two identifiers of distinct determined discriminating powers obtained by applying respective hashing functions to the first error-correcting code word; the system comprising:

means for obtaining biometric data relating to the individual;

means for converting the biometric data into a second digital string;

means for determining a second error-correcting code word corresponding substantially to adding the second digital string to the result of adding the first error-correcting code word to the first digital string stored on the first data medium in association with the identity relating to said individual;

means for determining a desired level of discrimination;

means for determining the identifier stored on the first data medium in association with the identity relating to said individual, having discriminating power corresponding substantially to the desired level of discrimination;

means for applying to the second error-correcting code word the hashing function in application of which said determined identifier was obtained; and means for comparing the result of applying said hashing function to said second error-correcting code word with the determined identifier.

6. A system according to claim 5, in which at least some of the hashing functions applied to the first error-correcting code word are selected to have an equiprobable arrival space comprising a number of possible values corresponding substantially to the determined discriminating power of the respective identifier.

7. A system according to claim 5, further comprising means for delivering a right when the comparing the result of applying said hashing function to said second error-correcting code word with the determined identifier finds equality between the result of applying said hashing function to the second error-correcting code word and the determined identifier.

8. A system according to claim 5, also using a second data medium storing in association, for at least said individual of the set of individuals: the first digital string obtained from biometric data relating to said individual and the identifiers of distinct determined discriminating powers obtained by applying respective hashing functions to the first error-correcting code word associated with said individual; the system further comprising, in relation to said individual of the set of individuals:

means for finding the first digital string stored on the second data medium and corresponding substantially to said second digital string;

means for finding the identifier stored on the second data medium in association with the found first digital string, having discriminating power corresponding substantially to the desired level of discrimination; and means for comparing the result of applying the hashing function in application of which the found identifier was obtained to the second error-correcting code word with the identifier as found.

9. A computer program product comprising code instructions stored on a non-transitory computer-readable medium, the code instructions being adapted, when loaded and executed by computer means, to implement a biometric verification method using a first data medium storing in association, for at least one individual of a set of individuals: an identity relating to said individual, the result of adding a first word of an error-correcting code associated with said individual to a first digital string obtained from biometric data relating to said individual and at least two identifiers of distinct determined discriminating powers obtained by applying respective hashing functions to the first error-correcting code word, comprising the following steps relating to an individual of the set of individuals:

obtaining biometric data relating to the individual;

converting the biometric data into a second digital string;

determining a second error-correcting code word corresponding substantially to adding the second digital string to the result of adding the first error-correcting code word to the first digital string stored on the first data medium in association with the identity relating to said individual;

determining a desired level of discrimination;

determining the identifier stored on the first data medium in association with the identity relating to said individual, having discriminating power corresponding substantially to the desired level of discrimination;

applying to the second error-correcting code word the hashing function in application of which said determined identifier was obtained; and comparing the result of applying said hashing function to said second error-correcting code word with the determined identifier.

10. A computer program product according to claim 9, in which at least some of the hashing functions applied to the first error-correcting code word are selected to have an equiprobable arrival space comprising a number of possible values corresponding substantially to the determined discriminating power of the respective identifier.

11. A computer program product according to claim 9, further comprising code instructions for delivering a right when the comparing the result of applying said hashing function to said second error-correcting code word with the determined identifier finds equality between the result of applying said hashing function to the second error-correcting code word and the determined identifier.

12. A computer program product according to claim 9, in which the method implemented by the code instructions comprised by the computer program product also uses a second data medium storing in association, for at least said individual of the set of individuals: the first digital string obtained from biometric data relating to said individual and the identifiers of distinct determined discriminating powers obtained by applying respective hashing functions to the first error-correcting code word associated with said individual; and further comprises the following steps relating to said individual of the set of individuals:

finding the first digital string stored on the second data medium and corresponding substantially to said second digital string;

finding the identifier stored on the second data medium in association with the found first digital string, having discriminating power corresponding substantially to the desired level of discrimination; and comparing the result of applying the hashing function in application of which the found identifier was obtained to the second error-correcting code word with the identifier as found.

\* \* \* \* \*